United States Patent
Scovetta

(10) Patent No.: US 8,726,014 B2
(45) Date of Patent: May 13, 2014

(54) SYSTEM AND METHOD FOR SECURELY UPDATING LICENSE FILES IN AN AUTOMATED LICENSING SYSTEM

(75) Inventor: Vincent Scovetta, Ronkonkoma, NY (US)

(73) Assignee: CA, Inc., Islandia, NY (US)

( * ) Notice: Subject to any disclaimer, the term of this patent is extended or adjusted under 35 U.S.C. 154(b) by 1111 days.

(21) Appl. No.: 11/552,046

(22) Filed: Oct. 23, 2006

(65) Prior Publication Data

US 2008/0098216 A1  Apr. 24, 2008

(51) Int. Cl.
*H04L 9/32* (2006.01)
*G06F 7/04* (2006.01)
*H04N 21/4627* (2011.01)
*H04N 21/458* (2011.01)
*H04N 21/254* (2011.01)
*G06F 21/10* (2013.01)

(52) U.S. Cl.
CPC ....... *H04N 21/4627* (2013.01); *H04N 21/4586* (2013.01); *H04N 21/2541* (2013.01); *H04L 9/32* (2013.01); *G06F 21/105* (2013.01)
USPC .................. 713/165; 713/167; 726/6; 726/18; 726/27; 380/201; 380/202; 380/233; 705/59; 705/76

(58) Field of Classification Search
CPC .......... H04N 21/4627; H04N 21/4586; H04N 21/2541; G06F 21/105
USPC .............................. 726/3, 5, 6, 18–19, 31–33; 380/201–202, 227–233; 709/223, 59, 709/71, 72, 76; 713/165, 167
See application file for complete search history.

(56) References Cited

U.S. PATENT DOCUMENTS

| | | | | | |
|---|---|---|---|---|---|
| 5,742,757 | A | * | 4/1998 | Hamadani et al. | 726/32 |
| 6,260,141 | B1 | * | 7/2001 | Park | 713/155 |
| 2002/0007456 | A1 | * | 1/2002 | Peinado et al. | 713/164 |
| 2002/0016846 | A1 | * | 2/2002 | Ono | 709/229 |
| 2003/0135756 | A1 | * | 7/2003 | Verma | 713/201 |
| 2004/0024688 | A1 | * | 2/2004 | Bi et al. | 705/37 |
| 2004/0162846 | A1 | * | 8/2004 | Nakahara et al. | 707/102 |
| 2004/0260765 | A1 | | 12/2004 | Re et al. | 709/202 |
| 2006/0143134 | A1 | * | 6/2006 | So et al. | 705/59 |
| 2006/0179058 | A1 | * | 8/2006 | Bram et al. | 707/9 |

* cited by examiner

*Primary Examiner* — Venkat Perungavoor
*Assistant Examiner* — Amir Mehrmanesh
(74) *Attorney, Agent, or Firm* — Baker Botts, L.L.P

(57) ABSTRACT

A system for managing license files comprises a memory operable to store a socket module. The system further comprises a processor communicatively coupled to the memory and operable to receive a command to open a license file, wherein the command is associated with a first user identifier. The license file is stored in a first remote node and is associated with a second user identifier. If the second user identifier matches the first user identifier, the processor is further operable to use the socket module to establish a socket connection with the first remote node. The processor is further operable to, using the socket connection, retrieve from the first remote node a file descriptor associated with the license file. The processor is further operable to apply an update to the license file, wherein the update is addressed according to the file descriptor. If the second user identifier does not match the first user identifier, the processor is further operable to prevent the updating of the license file.

35 Claims, 3 Drawing Sheets

48
CAI_lic_d 1.000 07-JUN-2008 0 5CB480D17500D0E0E7F2 "PC_686_2_566 3BA1 [5]"

SYSTEM AND METHOD FOR SECURELY UPDATING LICENSE FILES IN AN AUTOMATED LICENSING SYSTEM

TECHNICAL FIELD OF THE INVENTION

The present invention relates generally to managing licensing files and, more specifically, to a system and method for securely updating license files in an automated licensing system.

BACKGROUND OF THE INVENTION

Some software customers and vendors use electronic licensing systems to monitor and manage licenses associated with software products. In particular, when a customer installs a new software product in the customer's network, an electronic licensing system may generate a license file associated with the new software product. These license files are sometimes susceptible to tampering. In particular, a user in the customer's network may, without authorization, open and modify a particular license file. For example, the user may improperly change the expiration date of the license for a particular product. Such unauthorized tampering of license files may cause network problems for the customer and/or the vendor.

SUMMARY OF THE INVENTION

In accordance with the present invention, the disadvantages and problems associated with prior electronic licensing systems have been substantially reduced or eliminated.

According to certain embodiments, a method for managing license files comprises receiving from a remote server an update to a license file associated with a first user identifier. The method continues by establishing a socket connection between a first module and a second module. The method continues by transmitting from the first module to the second module, via the socket connection, a command to open the license file, wherein the command is associated with a second user identifier. The method continues by comparing at the second module the second user identifier with the first user identifier. If the first user identifier does not match the second user identifier, the second module prevents opening of the license file. If, however, the first user identifier matches the second user identifier, the method continues by transmitting from the second module to the first module, via the socket connection, a file descriptor associated with the license file. The method continues by applying the update to the license file, wherein the license file is opened by the second module and the update is addressed to the license file based at least in part on the file descriptor.

In some embodiments, a system for managing license files comprises a memory operable to store a socket module. The system further comprises a processor communicatively coupled to the memory and operable to receive a command to open a license file, wherein the command is associated with a first user identifier. The license file is stored in a first remote node and is associated with a second user identifier. If the second user identifier matches the first user identifier, the processor is further operable to use the socket module to establish a socket connection with the first remote node. The processor is further operable to, using the socket connection, retrieve from the first remote node a file descriptor associated with the license file. The processor is further operable to apply an update to the license file, wherein the update is addressed according to the file descriptor. If the second user identifier does not match the first user identifier, the processor is further operable to prevent the updating of the license file.

In other embodiments, a method for managing license files comprises receiving a command to open a license file, wherein the command is associated with a first user identifier and the license file is stored in a first remote node and is associated with a second user identifier. If the second user identifier matches the first user identifier, the method continues by establishing a socket connection with the remote node. The method continues by using the socket connection to retrieve from the remote node a file descriptor associated with the license file. The method continues by using the socket connection to apply an update to the license file, wherein the update is addressed according to the file descriptor. If, however, the second user identifier does not match the first user identifier, the method concludes by preventing the updating of the license file.

Various embodiments of the present invention may benefit from numerous advantages. It should be noted that one or more embodiments may benefit from some, none, or all of the advantages discussed below.

One advantage is that the licensing system of the present invention is operable to prevent unauthorized modification of a license file. In particular, the licensing system is operable to prevent a user or process from opening or modifying a license file if that user or process is not associated with a particular user identifier. When a license file is installed or generated, the licensing system may configure that license file with a particular user identifier. Subsequently, if a particular user or process attempts to modify the license file, the licensing system may verify that the particular user or process is associated with a user identifier that matches the user identifier associated with the license file. If the particular user or process is not associated with the appropriate user identifier, the licensing system may prevent the particular user or process from opening or modifying the license file.

Another advantage is that the licensing system is operable to use a socket connection to transmit updates to a particular license file. Because the socket connection may facilitate communication between processes operating on different servers or machines, a program operating on a particular server may use the socket connection to remotely open and update a license file that is stored on another server or machine. The ability to remotely update license files may conserve time and resources for customers and vendors.

Other advantages will be readily apparent to one having ordinary skill in the art from the following figures, descriptions, and claims.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE INVENTION

Figure 1:
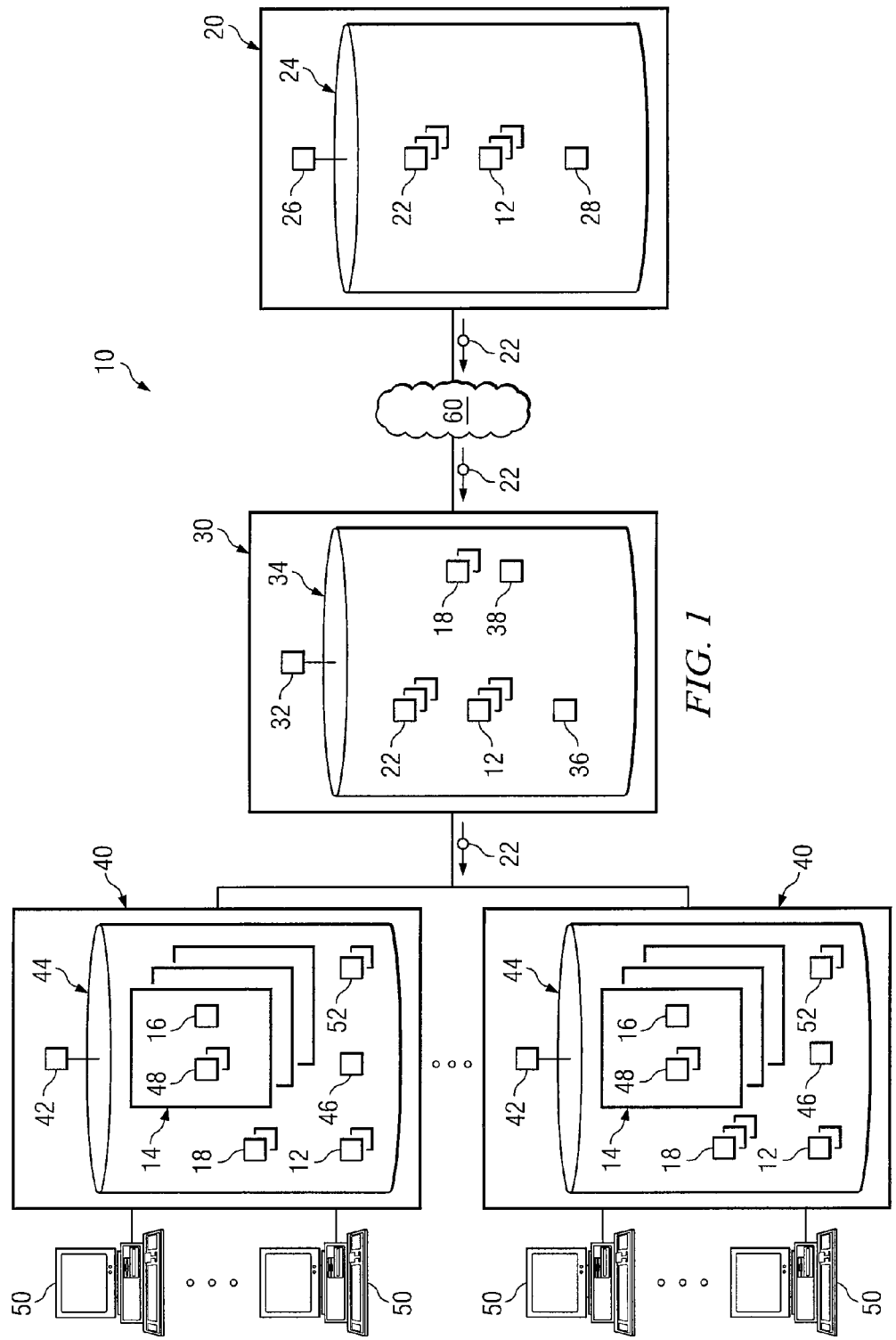
FIG. 1 illustrates one embodiment of a licensing system in accordance with the present invention.

FIG. 1 illustrates one embodiment of a licensing system 10. Licensing system 10 is generally operable to activate, monitor, and update license files 14 associated with products 12. Licensing system 10 is further operable to prevent the unauthorized modification of license files 14. In particular, upon receiving a command to modify a particular license file 14, licensing system 10 may determine whether to execute the command based at least in part on a user identifier (UID) 16 associated with the command. If licensing system 10 determines to execute the command, licensing system 10 may update the particular license file 14 using one or more sockets 18 stored in global server 30 and/or manager servers 40. Thus, licensing system 10 may reduce or eliminate tampering with license files 14. Licensing system 10 may comprise license server 20, global server 30, manager servers 40, and clients 50 communicatively coupled via network 60.

License server 20 is generally operable to generate updates 22 associated with license files 14. A particular license file 14 comprises data that defines the nature and scope of a customer's license to use a particular product 12. The term "license" refers to a right to install, operate, and/or use a particular product 12. In some embodiments, a license results from a licensing agreement between a vendor of product 12 and a customer of product 12. A license for product 12 may be associated with any number and combination of suitable characteristics. For example, a license for a particular product 12 may be associated with an expiration date, user count, product identifier, user name, account information, and any number and combination of suitable characteristics. One or more of these characteristics may be stored in license file 14. As an example, when a customer installs a new software product 12 on a computer system, the installation process may involve loading license file 14 associated with the new software product 12 onto the computer system. In this example, license file 14 may comprise the product identifier associated with the software product 12, the name of the customer, the number of users permitted to use the software product, the expiration date of the license, and/or any number and combination of suitable characteristics. A particular license file 14 may comprise data associated with one or more licenses to use any number and combination of products 12. License files 14 may be stored in global server 30, manager servers 40, and/or clients 50 (described below).

The term "product" 12 generally refers to software components, hardware components, or combinations thereof that may be installed in or associated with a computer system. In particular, product 12 may be a computer program, application, interface, software module, computer code, software agent, database, or any number and combination of hardware and/or software modules.

Once license file 14 has been installed in a customer's computer system, license file 14 may be modified by means of an "update" 22. Update 22 refers to data that may be written to license file 14. In some embodiments, applying update 22 to license file 14 may involve deleting old data from and/or writing new data to license file 14. In some embodiments, update 22 comprises a change to the scope of a customer's license to use product 12. For example, when a customer requests to extend a license to use a particular product 12, licensing system 10 may apply to license file 14 a particular update 22 that comprises a new expiration date. Applying the particular update 22 to license file 14 may comprise deleting the existing expiration date from license file 14 and writing the new expiration date to license file 14. Although update 22 in the foregoing example is a new expiration date, it should be understood that update 22 may comprise a modification, deletion, or addition of any suitable type of data in license file 14.

As explained above, license server 20 is generally operable to generate updates 22 associated with license files 14. In some embodiments, license server 20 may be associated with a particular vendor of products 12. License server 20 may receive and process requests from customers to purchase new products 12 or to update licenses associated with products 12. License server 20 may transmit updates 22 to global server 30 via network 60. License server 20 may comprise a general-purpose personal computer (PC), a Macintosh, a workstation, a Unix-based computer, a server computer, or any suitable processing device. License server 20 may be associated with any suitable user interface such as a display, microphone, keyboard, or any other appropriate terminal equipment according to particular configurations and arrangements. License server 20 may comprise a license memory 24 and a license processor 26.

License memory 24 is generally operable to store updates 22, products 12, and license logic 28. License logic 28 comprises rules for processing orders for new products and for generating updates 22 for license files 14. In some embodiments, license logic 28 may generate update 22 based at least in part on customer information such as, for example, a customer's account information, hardware requirements, system type, and other suitable information associated with the customer. This information may be stored in license memory 24 and may be used by license logic 28 to generate update 22.

License processor 26 is generally operable to execute license logic 28 to perform the described functions and operations. License processor 26 may comprise any suitable combination of hardware and software implemented in one or more modules to provide the described function or operation.

License server 20 may transmit updates 22 to global server 30 via network 60. In some embodiments, global server 30 may be associated with a customer of the vendor associated with license server 20. Global server 30 is generally operable to monitor and manage license files 14 for products 12 installed in a customer's computer system. In some embodiments, global server 30 may supervise the operations of manager servers 40 and clients 50. Global server 30 may determine whether to order products 12 and whether to request a particular update 22 from license server 20. Global server 30 may be operable to apply updates 22 received from license server 20 to the appropriate license files 14. Global server 30 may comprise a general-purpose personal computer (PC), a Macintosh, a workstation, a Unix-based computer, a server computer, or any suitable processing device. Global server 30 may be associated with any suitable user interface such as a display, microphone, keyboard, or any other appropriate terminal equipment according to particular configurations and arrangements. Global server 30 may comprise a global memory 34 and a global processor 32.

Global memory 34 is generally operable to store updates 22, products 12, and global logic 36. Global logic 36 comprises rules for monitoring and updating license files 14 in a customer's computer system. In some embodiments, global memory 34 may store sockets 18 and application program interface (API) 38 (described below).

Global processor 32 is generally operable to execute global logic 36 to perform the described functions and operations. Global processor 32 may comprise any suitable combination of hardware and software implemented in one or more modules to provide the described function or operation.

Global server 30 may be communicatively coupled with one or more manager servers 40. Manager servers 40 may access and execute products 12 to perform various functions and operations in a customer's computer system. A particular manager server 40 may be operable to supervise the operations of one or more clients 50. In some embodiments, manager server 40 may determine whether client 50 is in need of update 22 or product 12. Manager server 40 may store license files 14 and may transmit to global server 30 a request for a particular update 22 or product 12. Upon receiving update 22 from global server 30, manager server 40 may apply the received update 22 to the appropriate license file(s) 14. Manager server 40 may comprise a general-purpose personal computer (PC), a Macintosh, a workstation, a Unix-based computer, a server computer, or any suitable processing device. Manager server 40 may be associated with any suitable user interface such as a display, microphone, keyboard, or any other appropriate terminal equipment according to particular configurations and arrangements. Manager server 40 may comprise a manager memory 44 and a manager processor 42.

Manager memory 44 is generally operable to store license files 14, products 12, sockets 18, and manager logic 46. Manager logic 46 may comprise rules for supervising the operations of one or more clients 50.

Manager processor 42 is generally operable to execute manager logic 46 to perform the described functions and operations. Manager processor 42 may comprise any suitable combination of hardware and software implemented in one or more modules to provide the described function or operation.

Manager server 40 may be communicatively coupled to one or more clients 50. Client 50 may access and execute products 12 to perform various functions and operations in a customer's computer system. In some embodiments, client 50 may store one or more products 12 and one or more license files 14. Client 50 may comprise a general-purpose personal computer (PC), a Macintosh, a workstation, a Unix-based computer, a server computer, a pager, an electronic notebook, a Personal Digital Assistant (PDA), or any other suitable device (wireline, wireless, or both), component, or element capable of receiving, processing, storing, and/or communicating information with other components of system 10.

As explained above, license files 14 may be stored in global server 30, manager servers 40, and/or clients 50. A particular license file 14 may comprise data that defines the nature and scope of a customer's license to use a particular product 12. For example, license file 14 may store data such as the customer name, expiration date, user count, hardware requirements, and any number and combination of characteristics associated with a license for a particular product 12. In some embodiments, license file 14 associated with a particular product 12 may store a license key 48. License key 48 generally refers to a passcode that may be used to authenticate a license for a particular product 12. For example, prior to executing a particular product 12 associated with license file 14, global server 30 and/or manager server 40 may verify that license file 14 comprises a valid license key 48. If license file 14 does not comprise a valid license key 48, global server 30 and/or manager server 40 may prevent the execution of the associated product 12.

In some embodiments, license server 20 may generate license key 48 based on one or more characteristics of a license for a particular product 12. In particular, license server 20 may generate license key 48 based on the particular product 12, the user count, the license expiration date, the mainframe system, and/or the platform associated with a customer's order. It should be understood that license server 20 may generate license key 48 for a particular order based on any number and combination of suitable criteria. In some embodiments, license server 20 may transmit to global server 30 a particular license key 48 as update 22.

In some embodiments, each licensing file 14 may be associated with a particular file descriptor 52. File descriptor 52 is generally a numeric or alphanumeric key for accessing one or more files stored in memory. For example, to access a particular license file 14 stored in manager memory 44, an application may pass to a kernel in manager server 40 the particular file descriptor 52 associated with the particular license file 14. The kernel in manager server 40 may then use the received file descriptor 52 to access the particular license file 14 on behalf of the application. File descriptors 52 associated with files in manager memory 44 may be stored in a file descriptor table.

As explained above, global server 30 and manager servers 40 may store sockets 18. A socket 18 refers to a software object that facilitates two-way communication between two or more processes associated with system 10. The two or more processes may be performed on the same computer or on different computers in system 10. By using sockets 18, data communications between two processes may occur through a socket interface rather than through a standard file interface. In some embodiments, socket 18 may be a software object that connects an application to a network protocol. In some embodiments, global processor 32 may transmit TCP/IP messages to manager server 40 by opening socket 18 and reading and/or writing data to or from socket 18. Thus, socket 18 may resemble a two-way communications pipe that may be manipulated such that the underlying operating system may be used to transport messages across a network. Socket 18 may be configured according to any suitable operating system. For example, if global server 30 and manager server 40 are UNIX-based systems, socket 18 may be a UNIX-type socket. Global server 30 may use socket(s) 18 to apply updates 22 to license file(s) 14 stored in manager server 40.

In some embodiments, global server 30 may store a callable application program interface (API) 38. API 38 may allow license server 20 to interface with the operating environment of global server 30. For example, if license server 30 operates in a windows environment and if the customer system is a UNIX-based system, API 38 may provide an interface between license server 20 and global server 30. It should be understood that global server 30 and license server 20 may each be configured to operate according to any suitable operating system. License server 20 may transmit commands to global server 30 via API 38.

In certain embodiments, a command sent to global server 30 from license server 20 may be associated with a user identifier (UID) 16. In addition, or alternatively, each license file 14 may be associated with at least one UID 16. UID 16 may be a numeric or alphanumeric key that identifies a particular user or process. Based on UID 16 associated with license file 14, global server 30 may determine whether to allow a modification to license file 14. In particular, upon receiving a particular command to open license file 14, global server 30 may compare the particular UID 16 associated with the received command against the particular UID 16 associated with license file 14. If UID 16 associated with the command matches UID 16 associated with license file 14, then global server 30 may permit license file 14 to be opened and modified. However, if UID 16 associated with the command does not match UID 16 associated with license file 14, then global server 30 may prevent license file 14 from being opened or updated.

License server 20, global server 30, manager server 40, and clients 50 may be communicatively coupled by network 60.

Network 60 is a communication platform operable to exchange data or information between the various components of licensing system 10. In some embodiments, network 60 may represent an Internet architecture that enables global server 30 to communicate with licensing server 20. In other embodiments, network 60 may be a plain old telephone system (POTS). According to certain embodiments, network 60 may be any packet data network (PDN) offering a communications interface or exchange between any two nodes in system 10. Network 60 may further comprise any combination of the above examples and any local area network (LAN), metropolitan area network (MAN), wide area network (WAN), wireless local area network (WLAN), virtual private network (VPN), intranet, or any other appropriate architecture or system that facilitates communications between license server 20, global server 30, manager server 40, and/or clients 50.

In operation, global server 30 may remotely open and modify license files 14 in licensing system 10. By using sockets 18 and UIDs 16 associated with license files 14, global server 30 may prevent the unauthorized modification of license files 14.

In particular, license server 20 may generate a particular update 22 for license file 14. License file 14 may be associated with a first UID 16 and may be stored in manager server 40. Upon generating update 22, license server 20 may transmit to global server 30 a command to open license file 14. The command from license server 20 may be associated with a second UID 16. Global server 30 is operable to compare the first UID 16 against the second UID 16.

If the first UID 16 does not match the second UID 16, global server 30 may prevent license file 14 from being opened and/or modified. In particular, global server 30 may delete the command from license server 20 without opening license file 14. In some embodiments, global server 30 may return the command to license server 20 without opening license file 14. In addition, or alternatively, global server 30 may generate an alert signifying an unauthorized attempt to open and/or modify license file 14.

If the first UID 16 matches the second UID 16, global server 30 may use socket 18 in global memory 34 to establish a socket connection with manager server 40. Via the socket connection, global server 30 may open the particular license file 14 in manager memory 44. Using the socket connection, global server 30 may then retrieve from manager memory 44 a particular file descriptor 52 associated with the opened license file 14. In some embodiments, file descriptor 52 points to the opened license file 14 in manager memory 44. Global server 30 may transmit file descriptor 52 to license server 20 via API 38.

As explained above, license server 20 is operable to generate update 22 for license file 14. In some embodiments, update 22 may comprise a new or modified license key 48. License key 48 may define an expiration date, user count, hardware requirements, product identifier, and any number and combination of suitable characteristics of a license for a particular product 12. License server 20 is operable to address update 22 based at least in part on file descriptor 52 from global server 30. License server 20 may then transmit update 22 to global server 30 via API 38. Using the socket connection with manager server 40, global server 30 may apply update 22 to license file 14.

In some embodiments, license server 20 may be associated with a vendor of products 12. Global server 30 and manager server 40 may be part of a customer's enterprise network. According to certain embodiments, global server 30 and/or manager server 40 may be operable to convert file descriptor 52 to a stream-oriented file pointer prior to applying update 22 to license file 14.

Figure 2:
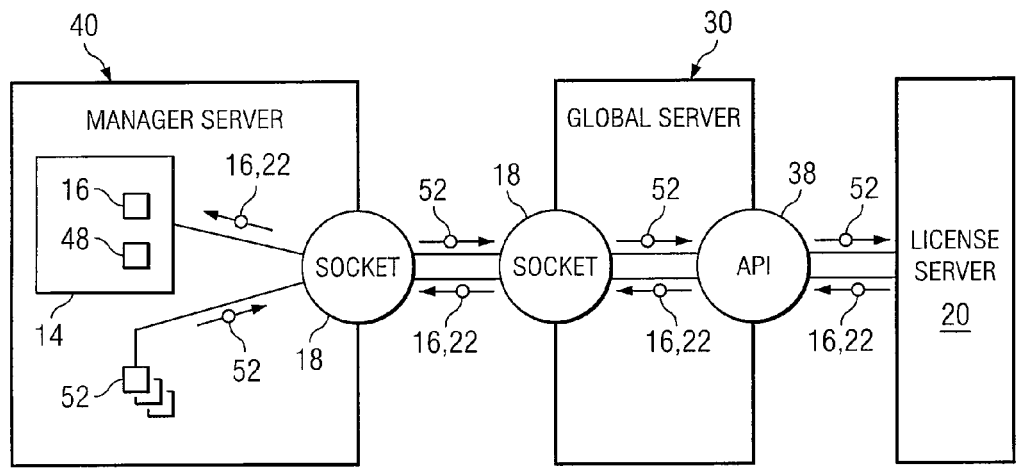
FIG. 2 illustrates a flow of operation between various components of the licensing system illustrated in FIG. 1, according to certain embodiments.

FIG. 2 illustrates a flow of operation between license server 20, global server 30, and manager server 20 according to certain embodiments. Global server 30 may generate a request to update license file 14 stored in manager server 40. Global server 30 may use API 38 to transmit the request to license server 20. Upon receiving the request, license server 20 may transmit a command to global server 30 to open license file 14. Since license file 14 is stored in manager server 30, global server 30 may establish a connection with manager server 30 using sockets 18 in global memory 34 and manager memory 44. Using the socket connection, global server 30 may forward to manager server 40 the command to open license file 14.

In some embodiments, the command from license server 20 to open license file 14 may be associated with a first UID 16. Global server 30 and/or manager server 40 may prevent license file 14 from being opened if the first UID 16 associated with the command does not match a particular UID 16 associated with license file 14. Thus, global server 30 and/or manager server 40 may prevent unauthorized modifications to license file 14.

If the first UID 16 matches the particular UID 16 associated with license file 14, manager server 40 may open license file 14. License server 20 may then transmit to API 38 in global server 30 a command to retrieve file descriptor 52 associated with the opened license file 14. In some embodiments, global server 30 may retrieve file descriptor 52 from a file descriptor table stored in global memory 34. In other embodiments, the file descriptor table comprising the requested file descriptor 52 may be stored in manager memory 44. If the file descriptor table comprising the requested file descriptor 52 is stored in manager memory 44, global server 30 may use the socket connection between global server 30 and manager server 40 to retrieve from the file descriptor table the requested file descriptor 52. Using API 38, global server 30 may transmit the requested file descriptor 52 to license server 20.

Using file descriptor 52, license server 20 may address update 22 to the appropriate license file 14. License server 20 may then transmit to API 38 in global server 30 the requested update 22 to license file 14. Via the socket connection between global server 30 and manager server 40, global server 40 may apply update 22 to the opened license file 14 in manager memory 34. In some embodiments, update 22 may be a new or updated license key 48. The new or updated license key 48 may define the scope of the updated license for product 12. For example, if the original request was to increase the user count for a particular product 12, then update 22 may be a particular license key 48 that authorizes the installation of the particular product 12 for the increased number of users. It should be understand that license key 48 may define any number and combination of suitable characteristics of a particular license for one or more products 12. Once license file 14 is updated, license file 14 may be closed and global server 30 may close the socket connection with manager server 40.

In some embodiments, global server 30 may use an "OPEN" function to access license file 14. Alternatively, or in addition, global server 30 may use an "FOPEN" function to obtain file descriptor 52 associated with the particular license file 14. An "FDOPEN" function may be used to convert file descriptor 52 to a stream-oriented file pointer that points to the opened license file 14 in global server 30. Global server 30 may then use sockets 18 to write update 22 to the particular license file 14 designated by file descriptor 52. Once update 22 is applied to license file 14, global server 30 may close the socket connection with manager server 40. Thus, sockets 18 may allow global server 30 to remotely apply updates to one or more license files in a customer's enterprise network.

In some embodiments, global server 30 may be operable to remotely update various types of license files 14. These types of license files 14 may include ".OLF" files, "lic98.dat" files, "lic98.log" files, "vendor.dat" files, and "lic98.cap" files. Generally, an ".OLF" file comprises a list of licensed products 12 obtained from a vendor associated with license server 20. A "lic98.dat" file comprises a list of those products 12 for which license checks have been made. A "lic98.log" file comprises a log of events detected during operation of a debugging function. A "vendor.dat" file comprises a list of vendor codes indexed by vendor name. A "lic98.cap" file comprises a list of hardware components in a customer's enterprise network. License server 20 may generate updates 22 for at least the types of license files 14 described above.

Although FIG. 2 illustrates global server 30 updating license file 14 in manager server 40, it should be understood that, in some embodiments, license file 14 may be stored in client 50 and/or global server 30. If license file 14 is stored in client 50, manager server 40 may be operable to perform the functions and operations described above with respect to global server 30.

Figures 3, 4:
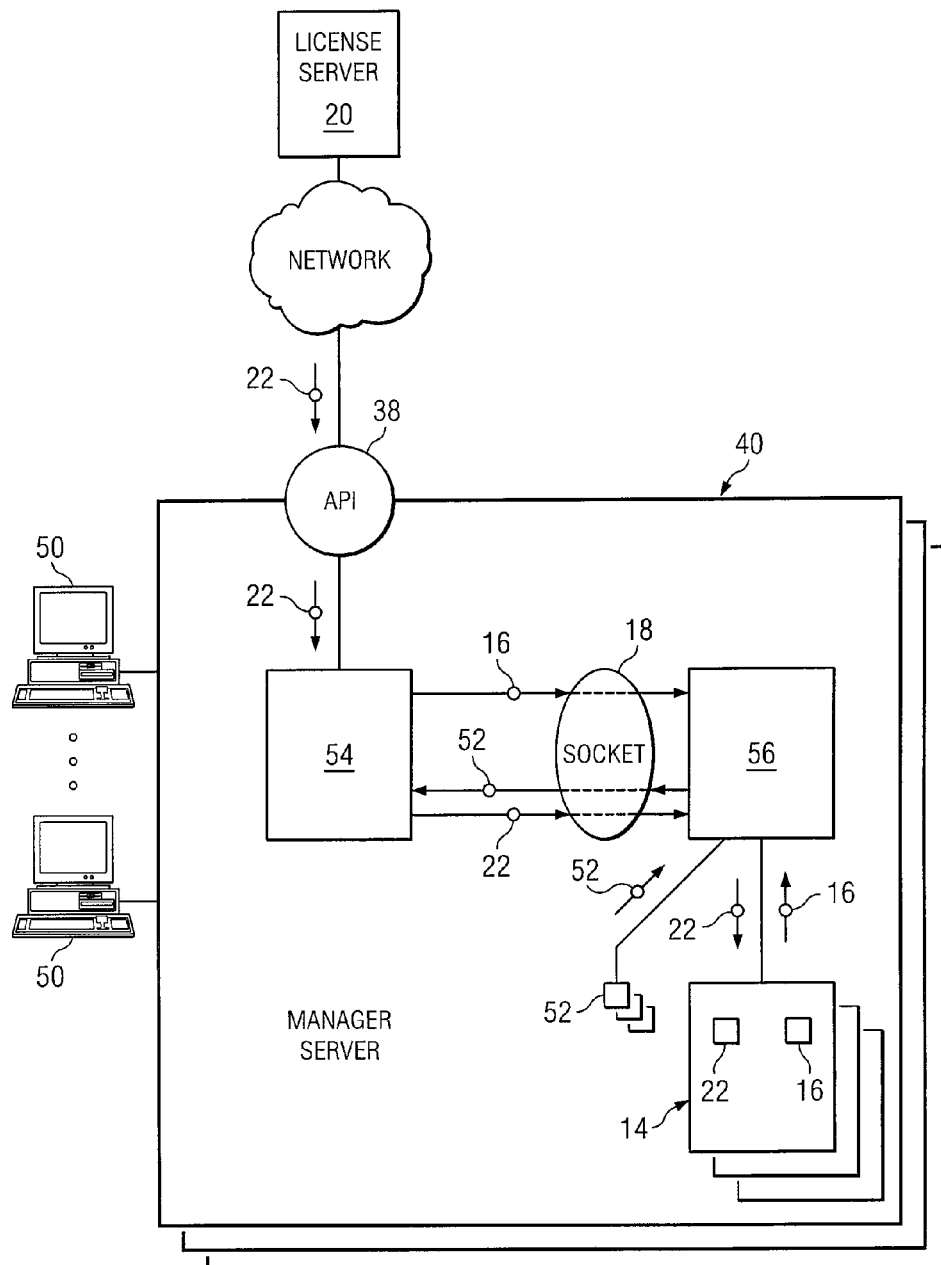
FIG. 3 illustrates a flow of operation between various components of the licensing system, according to certain embodiments.
FIG. 4 illustrates an example license key, according to certain embodiments.

FIG. 3 illustrates an embodiment of system 10 in which multiple manager servers 40 are connected directly to network 60. In this embodiment, each manager server 40 is communicatively coupled to one or more clients 50. A particular manager server 40 is operable to store license files 14 for the software and hardware components used by the one or more clients 50 associated with that manager server 40. In this embodiment, each manager server comprises API 38 for interfacing with license server 20. Using API 38, each manager server 40 is operable to transmit to license server 20 a request for one or more updates 22 to license file 14. In addition, manager server 40 may transmit to license server 20 orders for products 12. In each manager server 40, manager memory 44 may store a license module 54 and an update module 56.

License module 54 comprises logic or instructions for updating, supervising, monitoring, or otherwise processing license files 14 stored in manager memory 44. When executed by manager processor 42, license module 54 is operable to receive update 22 from license server 20, to receive file descriptor 52 from update module 56, and to use file descriptor 52 to address update 22 to the appropriate license file 14. License module 54 may communicate with update module 56 via a socket connection supported by socket 18 in manager memory 44.

Update module 56 comprises logic or instructions for applying update 22 to license file 14. By means of socket 18 in manager memory 44, update module 56 is generally operable to communicate and cooperate with license module 54 to apply update 22 to license file 14. In particular, update module 56 is operable to use UID 16 to authenticate a command to modify license file 14, to open license file 14, to determine file descriptor 52 associated with license file 14, and to apply update 22 to license file 14 based at least in part on the determined file descriptor 52.

In operation, manager server 40 uses API 38 to send to license server 20 a request for update 22 to license file 14 stored in manager memory 44. License server 20 processes the request and sends to manager server 40 the requested update 22. Upon receiving update 22 from license server 20, manager processor 42 executes license module 54. When executed, license module 54 uses socket 18 in manager memory 44 to establish a socket connection with update module 56 and to transmit to update module 56 a command to open license file 14. The command to open license file 14 is associated with a first UID 16. In some embodiments, the first UID 16 may identify license module 54. To determine whether the command to open license file 14 is valid, update module compares the first UID 16 against a second UID 16 associated with license file 14. In some embodiments, the second UID 16 may be stored in license file 14. If the first UID 16 matches the second UID 16, update module 56 opens license file 14. However, if the first UID 16 does not match the second UID 16, update module 56 prevents license file 14 from being opened. Once license file 14 is opened, update module 56 retrieves, from a file descriptor table in manager memory 44, file descriptor 52 associated with license file 14. Update module 56 transmits the retrieved file descriptor 52 via the socket connection to license module 54. License module 54 then uses file descriptor 52 to address update 22 to the appropriate license file 14. License module 54 then transmits update 22 via the socket connection to update module 56. Based at least in part on the retrieved file descriptor 52, update module 56 applies update 22 to license file 14. Once update 22 is applied to license file 14, update module 56 closes license file 14 and terminates the socket connection with license module 54.

In some embodiments, a customer's enterprise network may comprise any number of manager servers 30. When a particular manager server 30 receives an update 22 to license file 14, that manager server 30 may be operable to use license module 54 and update module 56 to securely update the particular license file 14. Because update module 56 is operable to compare UIDs 16 associated with updates 22, update module 56 is operable to prevent unauthorized modifications to license files 14. By using license module 54, update module 56, and socket 18, manager server 30 is operable to update license files 14 in a secure and automated fashion. Thus, license system 10 is operable to conserve system resources.

The foregoing example illustrates use of a local socket 18 that facilitates communication between processes within a single server. In some embodiments manager server 30 may comprise socket 18 that facilitates communication between processes operating on different servers.

FIG. 4 illustrates an example license key 48, according to certain embodiments. In the present example, license key 48 is an alphanumeric passcode that defines a plurality of characteristics associated with a license for a particular product 12. In some embodiments, license key 48 may be used by client 50, manger server 40, and/or global server 30 to verify that a particular product 12 may be installed and/or used in a customer's system. In the present example, license key 48 is based at least in part on product 12, the user count, the license expiration date, and the hardware associated with product 12. As explained above, license key 48 may be stored in one or more license files 14. Licensing system 10 may use UID 16 to prevent an unauthorized modification of license key 48 in license file 14. In particular, licensing system 10 may prevent a user or process from writing to a particular license file 14 if that user or process is not associated with a particular UID 16.

License key 48 in the present example defines a plurality of characteristics associated with a license for product 12. In particular, the example license key 48 comprises an expiration date (07-JUN-2008) as well as a user count ([5]) for the license for product 12. In addition, the example license key 48 comprises a product component identifier (3BA1) and a machine type (PC__686__2__566) associated with the particular product 12. The example license key 48 also comprises an algorithmic composite of the foregoing elements (5CB480D17500D0E0E7F2). In some embodiments, the combination of the foregoing fields may prevent unauthorized use or installation of product 12.

Various embodiments of the present invention may benefit from numerous advantages. It should be noted that one or more embodiments may benefit from some, none, or all of the advantages discussed below. One advantage is that licensing system 10 is operable to prevent unauthorized modification of license file 14. In particular, licensing system 10 is operable to prevent a user or process from opening or modifying license file 14 if that user or process is not associated with a particular UID 16. When license file 14 is installed or generated, licensing system 10 may configure that license file 14 with a particular user identifier 16. Subsequently, if a particular user or process attempts to modify the particular license file 14, the licensing system 10 may verify that the particular user or process is associated with a user identifier 16 that matches the particular user identifier 16 associated with the particular license file 14. If the particular user or process is not associated with the appropriate user identifier 16, licensing system 10 may prevent the particular user or process from opening or modifying license file 14.

Another advantage is that the licensing system 10 is operable to use a socket connection to transmit updates to a particular license file 14. The socket connection may facilitate communication between processes operating on different servers or machines. Thus, a program operating on a particular server may use the socket connection to remotely open and update license file 14 that is stored on another server or machine. The ability to remotely update license files 14 may conserve time and resources for customers and vendors.

Figure 5:
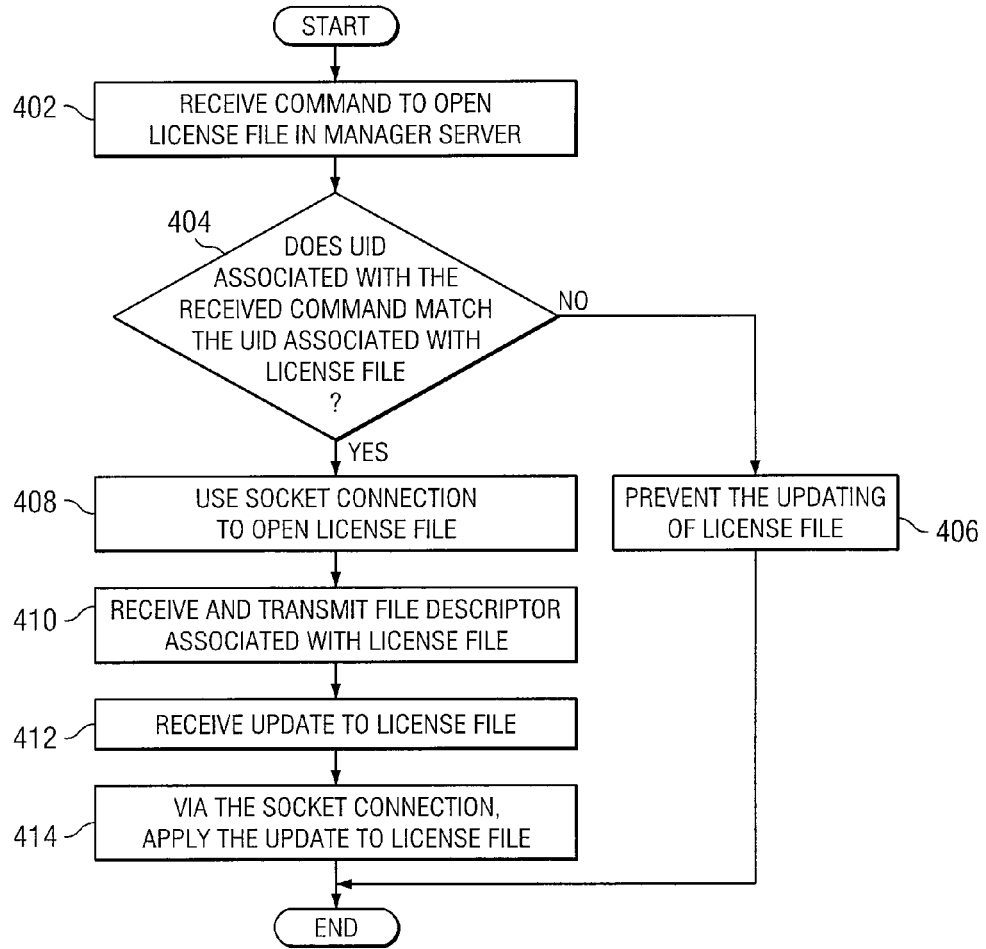
FIG. 5 illustrates a flowchart for updating license files, according to certain embodiments.

FIG. 5 illustrates a flowchart of a method for managing license files 14 according to certain embodiments. The method begins at step 402 when global server 30 receives from license server 20 via API 38 a command to open a particular license file 14. The command may be associated with a first UID 16. In some embodiments, the particular license file 14 may be remote from global server 30. In particular, license file 14 may be stored in manager server 40. At step 404, global server 30 may determine whether the first UID 16 associated with the command from license server 20 matches a second UID 16 associated with the particular license file 14 to be opened. If global server 30 determines at step 404 that the first UID 16 does not match the second UID 16, then at step 406, global server 30 may prevent the updating of the particular license file 14. In some embodiments, global server 30 may prevent the updating of the particular license file 14 by deleting or rejecting the command from license server 20 without forwarding the command to manager server 40. In other embodiments, global server 30 may prevent the updating of the particular license file 14 by generating and transmitting an alert to an operator associated with licensing system 10.

If global server 30 determines at step 404 that the first UID 16 associated with the command from license server 20 matches the second UID 16 associated with license file 14, then at step 408, global server 30 uses socket 18 in global memory 34 to establish a socket connection with socket 18 in manager memory 44. Using the socket connection, global server 30 may open license file 14 in manager memory 44. At step 410, global server 30 may retrieve file descriptor 52 associated with the opened license file 14. File descriptor 52 may be retrieved from a file descriptor table stored in global memory 34 or in manager memory 44. Global server 30 may use API 38 to transmit the retrieved file descriptor 52 to license server 20.

At step 412, global server 30 receives from license server 20 update 22 for the opened license file 14. The received update 22 may be associated with and/or addressed according to the retrieved file descriptor 52. At step 414, global server 30, via the socket connection with manager server 40, applies the received update 22 to the opened license file 14. In some embodiments, update 22 may be a new or modified license key 48. License file 14 may then be closed and the method may end.

Although the present invention has been described in several embodiments, a myriad of changes and modifications may be suggested to one skilled in the art, and it is intended that the present invention encompass such changes and modifications as fall within the scope of the present appended claims.

What is claimed is:

1. A system for managing license files, comprising:
a memory operable to store a socket module comprising software that facilitates two-way communication between two processes through a socket interface rather than a file interface; and
a processor communicatively coupled to the memory and operable to:
receive a command to open and update a license file associated with a software product, the license file comprising data defining the scope of one or more licenses to use the software product by the customer, wherein:
the command is associated with a first user identifier; and
the license file is stored in a first remote node and is associated with a second user identifier;
compare the second user identifier with the first user identifier to determine whether to allow an update of the license file; and
if the second user identifier matches the first user identifier:
use the socket module to establish a socket connection via the socket interface between the processor and the first remote node to connect the processor to a network protocol; and
use the socket connection to:
open the license file;
retrieve from the first remote node a file descriptor associated with the opened license file;
prior to applying an update to the opened license file, convert the file descriptor to a stream-oriented file pointer; and
apply the update to the opened license file at the first remote node, wherein the update is addressed according to the file descriptor; and
if the second user identifier does not match the first user identifier, prevent the update of the license file.

2. The system of claim 1, wherein:
the command is received from a second remote node; and
prior to applying the update, the processor is operable to receive the update from the second remote node.

3. The system of claim 2, wherein the first remote node is associated with a customer and the second remote node is associated with a vendor.

4. The system of claim 1, wherein the socket connection is a UNIX socket connection.

5. The system of claim 1, wherein:
the license file is opened by an update module executed by the first remote node; and
the file descriptor points to the opened license file in the first remote node.

6. The system of claim 1, wherein the license file defines a license for a software application stored in the first remote node.

7. The system of claim 1, wherein the update comprises a license key associated with a software application stored in the first remote node.

8. The system of claim 7, wherein the license key identifies an expiration date and a user count associated with a license for the software application.

9. The system of claim 7, wherein applying the update comprises writing the license key to the license file.

10. The system of claim 1, wherein preventing the updating of the license file comprises deleting the command without opening the license file.

11. The system of claim 1, wherein, prior to applying the update, the processor is operable to convert the file descriptor to a stream-oriented file pointer.

12. The system of claim 1, the processor further operable to apply the update by:
  opening the license file at the remote node; and
  applying the update to the license file across the socket connection to the first remote node, the update comprising a location of the opened license file at the first remote node.

13. The system of claim 1, the processor further operable to:
  use an application program interface (API) to transmit the file descriptor to a license server; and
  use the API to receive the update to the license file from the license server.

14. The system of claim 1, the processor of the global server further operable to request the update to the license file from a second remote node associated with a vendor of a software product associated with the license file.

15. A method for managing license files, comprising:
  receiving a command to open and update a license file associated with a software product, the license file comprising data defining the scope one or more licenses to use the software product by a customer, wherein:
    the command is associated with a first user identifier; and
    the license file is stored in a first remote node and is associated with a second user identifier;
  comparing the second user identifier with the first user identifier to determine whether to allow an update of the license file; and
  if the second user identifier matches the first user identifier:
    establishing a socket connection with the first remote node, the socket connection facilitating two-way communication between two processes through a socket interface rather than a file interface, the socket connection connecting to the first remote node via a network protocol; and
    using the socket connection to:
      open the license file;
      retrieve from the first remote node a file descriptor associated with the opened license file;
      prior to applying an update to the opened license file, convert the file descriptor to a stream-oriented file pointer; and
      apply the update to the opened license file at the first remote node, wherein the update is addressed according to the file descriptor; and
  if the second user identifier does not match the first user identifier, preventing the updating of the license file.

16. The method of claim 15, wherein the command is received from a second remote node, and further comprising, prior to applying the update, receiving the update from the second remote node.

17. The method of claim 16, wherein the first remote node is associated with a customer and the second remote node is associated with a vendor.

18. The method of claim 16, wherein:
  the command is received by a third node;
  the socket connection is established between the third node and the first remote node; and
  using the socket connection, the update is applied to the license file by the third node.

19. The method of claim 18, wherein the socket connection permits two-way communication between a first process operating at the first remote node and a second process operating at the third node.

20. The method of claim 15, wherein the socket connection is a UNIX socket connection.

21. The method of claim 15, wherein:
  the license file is opened by an update module executed by the first remote node; and
  the file descriptor points to the opened license file in the first remote node.

22. The method of claim 15, wherein the license file defines a license for a software application stored in the first remote node.

23. The method of claim 15, wherein the update comprises a license key associated with a software application stored in the first remote node.

24. The method of claim 23, wherein the license key defines an expiration date and a user count associated with a license thr the software application.

25. The method of claim 23, wherein applying the update comprises writing the license key to the license file.

26. The method of claim 15, wherein preventing the updating of the license file comprises deleting the command without opening the license file.

27. The method of claim 15, further comprising, prior to applying the update, converting the file descriptor to a stream-oriented file pointer.

28. A method for managing license files, comprising:
  receiving from a remote server an update to a license file associated with a first user identifier and a software product, the license file comprising data defining the scope one or more licenses to use the software product by a customer associated with the first user identifier;
  establishing a socket connection between a first module and a second module, the socket connection facilitating two-way communication between two processes through a socket interface rather than a file interface, the socket connection connecting to the first remote node via a network protocol;
  transmitting from the first module to the second module, via the socket connection, a command to open the license file, wherein the command is associated with a second user identifier;
  comparing at the second module the second user identifier with the first user identifier to determine whether to allow the update of the license file; and
  if the first user identifier matches the second user identifier:
    transmitting from the second module to the first module, via the socket connection, a file descriptor associated with the license file; and
    applying, by the first module, the update to the license file, wherein:

the license file is opened by the second module;

prior to applying the update to the opened license file, the file descriptor is converted to a stream-oriented file pointer; and the update is addressed to the opened license file at the second module based at least in part on the file descriptor.

29. The method of claim 28, wherein, if the first user identifier does not match the second user identifier, the second module prevents opening of the license file.

30. The method of claim 28, wherein:

the first module and the second module are executed by a customer server;

the license file is associated with a software application stored by the customer server; and the remote server is associated with a vendor of the software application.

31. The method of claim 28, wherein:

the first module and the second module are executed by a customer server; and the socket connection permits two-way communication between the first module and the second module.

32. The method of claim 28, wherein the socket connection is a UNIX socket connection.

33. The method of claim 28, wherein the file descriptor points to the license file.

34. The method of claim 28, further comprising, prior to applying the update, converting the file descriptor to a stream-oriented file pointer.

35. The method of claim 28, wherein:

the first module and the second module are executed by a customer server;

the license file is associated with a software application stored by the customer server; and the update comprises a license key that defines an expiration date and a user count associated with a license for the software application.

* * * * *